US009313814B2

(12) United States Patent
Lee et al.

(10) Patent No.: US 9,313,814 B2
(45) Date of Patent: Apr. 12, 2016

(54) ESTABLISHING WIRELESS COMMUNICATION VIA PROXIMITY DETECTION

(71) Applicants: Kwan Ho Lee, Mountain View, CA (US); Anand S. Konanur, Sunnyvale, CA (US); Xintian E. Lin, Mountain View, CA (US); Ulun Karacaoglu, San Diego, CA (US)

(72) Inventors: Kwan Ho Lee, Mountain View, CA (US); Anand S. Konanur, Sunnyvale, CA (US); Xintian E. Lin, Mountain View, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 14/135,742

(22) Filed: Dec. 20, 2013

(65) Prior Publication Data

US 2015/0181631 A1     Jun. 25, 2015

(51) Int. Cl.

| H04B 1/00 | (2006.01) |
|---|---|
| H04W 76/02 | (2009.01) |
| H04W 4/00 | (2009.01) |
| H04B 1/40 | (2015.01) |
| H04W 8/00 | (2009.01) |

(52) U.S. Cl.
CPC ............... *H04W 76/023* (2013.01); *H04B 1/40* (2013.01); *H04W 4/008* (2013.01); *H04W 8/005* (2013.01)

(58) Field of Classification Search
USPC ............... 455/456.3, 41.2, 404.2, 67.11, 334, 455/41.1, 412.1, 411, 415, 412.2; 340/10.1, 340/572.1, 10.34, 539.22, 10.42
See application file for complete search history.

(56) References Cited

U.S. PATENT DOCUMENTS

| 2006/0206582 | A1* | 9/2006 | Finn ...................... H04H 60/73 709/217 |
| 2007/0036368 | A1* | 2/2007 | Hettinger ................ G07F 17/32 381/107 |
| 2008/0001735 | A1* | 1/2008 | Tran .................... G06F 19/3418 340/539.22 |
| 2011/0165701 | A1* | 7/2011 | Takahashi .......... C07K 16/4283 436/501 |
| 2011/0312279 | A1* | 12/2011 | Tsai ....................... G01S 11/02 455/67.11 |
| 2013/0183924 | A1* | 7/2013 | Saigh .................... H04W 4/025 455/404.2 |
| 2014/0155098 | A1* | 6/2014 | Markham ............ H04B 1/0064 455/456.3 |

* cited by examiner

*Primary Examiner* — Ganiyu A Hanidu
(74) *Attorney, Agent, or Firm* — Sutherland Asbill & Brennan LLP

(57) ABSTRACT

The present disclosure relates to computer-implemented systems and methods for wireless communication via proximity detection. The method may include determining, by a computer via a plurality of induction coils in a proximity transponder, a magnetic field emitted from a base station. The computer may include one or more processors, a radio transceiver, and the proximity transponder. The method may also include transmitting, by the proximity transponder to the base station in response to the magnetic field, identification information. Additionally, the method may include receiving, from the base station, a verification of the identification information. The method may also include establishing, by the radio transceiver based at least in part on the verification, a radio connection with the base station.

24 Claims, 4 Drawing Sheets

ESTABLISHING WIRELESS COMMUNICATION VIA PROXIMITY DETECTION

TECHNICAL FIELD

The present disclosure generally relates to wireless communication, and in particular, to proximity detection.

BACKGROUND

When establishing wireless communication between a user device and another device, users may typically provide manual input to at various points in the process. For example, the user may instruct the user device to beginning searching for other devices, supply credential information (e.g., logins, passwords, personal identification numbers, network addresses, etc.), and provide confirmation of the credential information. In certain cases, manual providing such information may prove tedious and/or time-intensive.

BRIEF DESCRIPTION OF THE DRAWINGS

Reference will now be made to the accompanying figures and diagrams, which are not necessarily drawn to scale, and wherein.

DETAILED DESCRIPTION

Figure 1:
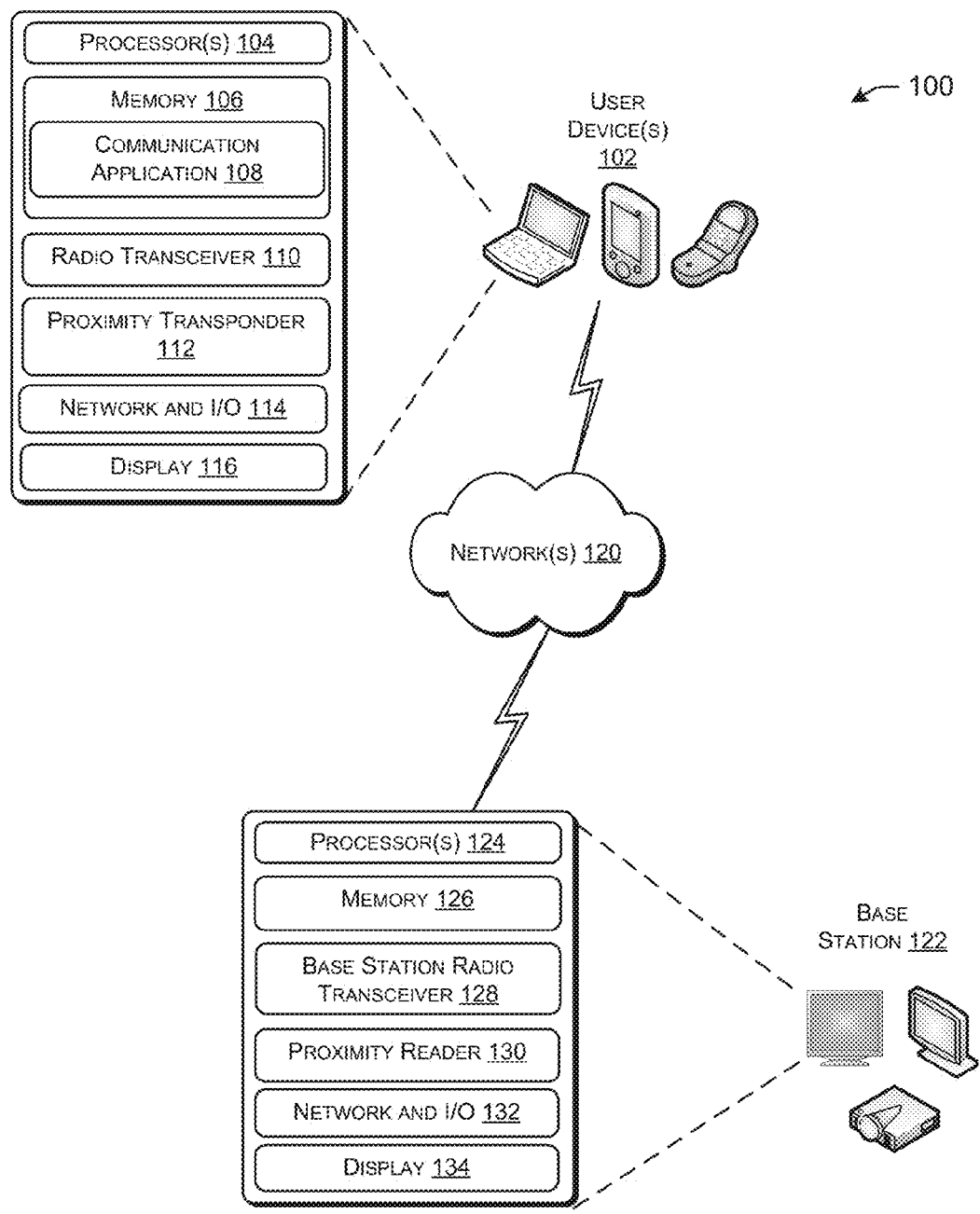
FIG. 1 shows a block diagram of a system for establishing wireless communication via proximity detection, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter.

According to certain embodiments, the functionality provided by the receiver and the transmitter may be included in a single transceiver device.

The present disclosure relates to computer-implemented systems and methods for wireless communication via proximity detection. According to one or more embodiments of the disclosure, a device is provided. The device may include a radio transceiver and a proximity transponder having a plurality of inductive coils. The device may also include at least one memory for storing data and computer-executable instructions. Additionally, the device may also include at least one processor to access the at least one memory and to execute the computer-executable instructions. Furthermore, the at least one processor may be configured to execute the instructions to detect, by the proximity transponder via the plurality of inductive coils, a magnetic field emitted from a base station. Additionally, the at least one processor may be configured to execute the instructions to transmit, by the proximity transponder to the base station in response to the magnetic field, identification information. The at least one processor may also be configured to execute the instructions to receive, from the base station, a verification of the identification information. The at least one processor may also be configured to execute the instructions to establish, by the radio transceiver based at least in part on the verification, a radio connection with the base station.

According to one or more embodiments of the disclosure, a method is provided. The method may include determining, by a computer via a plurality of induction coils in a proximity transponder, a magnetic field emitted from a base station. The computer may include one or more processors, a radio transceiver, and a proximity transponder. The method may also include transmitting, by the proximity transponder to the base station in response to the magnetic field, identification information. Additionally, the method may include receiving, from the base station, a verification of the identification information. The method may also include establishing, by the radio transceiver based at least in part on the verification, a radio connection with the base station.

According to one or more embodiments of the disclosure, a non-transitory computer-readable medium is provided. The non-transitory computer-readable medium may have embodied thereon instructions executable by one or more processors. The instructions may cause the one or more processors to determine, by a proximity transponder having a plurality of inductive coils, a magnetic field emitted from a base station. Additionally, the computer-readable medium may include instructions to transmit, via the proximity transponder, to the base station in response to the magnetic field, identification information. Moreover, the computer-readable medium may include instructions to receive, from the base station, a verification of the identification information. Further still, the computer-readable medium may include instructions to establish, by a radio transceiver based at least in part on the verification, a radio connection with the base station.

According to one or more embodiments of the disclosure, a system is provided. The system may include a radio transceiver and a proximity reader. The device may also include at least one memory for storing data and computer-executable instructions. Additionally, the system may also include at least one processor to access the at least one memory and to execute the computer-executable instructions. Furthermore, the at least one processor may be configured to execute the instructions to emit, by the proximity reader, a magnetic field. Additionally, the at least one processor may be configured to execute the instructions to receive, by the proximity reader in response to the magnetic field, identification information associated with a user device. The at least one processor may also be configured to execute the instructions to determine whether the identification information is valid. The at least one processor may also be configured to execute the instructions to establish, by the radio transceiver upon determination that the identification is valid, a radio connection with the user device.

The above principles, as well as perhaps others, are now illustrated with reference to FIG. 1, which depicts a system 100 for wireless communication via proximity detection. The system 100 may include a user device 102 having one or more computer processors 104, a memory 106, which may store a communication application 108, a radio transceiver 110, a proximity transponder 112, network and input/output (I/O) interfaces 114, and a display 116 in communication with each other. The system 100 may also include a network 120 to facilitate communication between the user device 102 and one or more base stations 122. The base station 122 may include one or more computer processors 124, a memory 126, a base station radio transceiver 128, a proximity reader 130, a network and input/output (I/O) interfaces 132, and a display 134 in communication with each other. It will be appreciated that all radio transceivers described with respect to the user device 102 and base station(s) 122 may be configured to receive and/or transmit any type of radio signals (e.g., WiFi radio signals, WiGig radio signals, Bluetooth radio signals, Bluetooth Low-Energy radio signals, etc.).

The computer processors 104/124 may comprise one or more cores and may be configured to access and execute (at least in part) computer-readable instructions stored in the memory 106/126. The one or more computer processors 104/124 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104/124 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/126 may comprise one or more computer-readable storage media (CRSM). In some embodiments, the memory 106/126 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/126 may store an operating system that includes a plurality of computer-executable instructions that may be implemented by the computer processor 104/124 to perform a variety of tasks to operate the interface(s) and any other hardware installed on the user device 102. The memory 106/126 may also store content that may be displayed by the user device 102 or transferred to other devices (e.g., headphones) to be displayed or played by the other devices. The memory 106/126 may also store content received from the other devices. The content from the other devices may be displayed, played, or used by the user device 102 to perform any necessary tasks or operations that may be implemented by the computer processor 104/124 or other components in the user device 102 and/or base station 122.

The network and I/O interfaces 114/134 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2012, published Mar. 29, 2012), the Bluetooth standard, or any other wireless standard and/or a combination thereof. The wireless system (not shown) may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 120 may include, but is not limited to: the Internet, a private network, a virtual private network, a wireless wide area network, a local area network, a metropolitan area network, a telephone network, and so forth.

The display 116/134 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

Broadly, a radio connection between a user device 102 and a base station 122 may be automatically established upon the user device 102 entering within a certain proximity of the base station 122. For example, the proximity reader 130 included in the base station 122 may be configured to emit a magnetic field. In certain embodiments, the magnetic field may be emitted in an approximately spherical shape around the base station 122. Furthermore, the range of the magnetic field may be a radius of approximately 1.5 meters to 2 meters. To this end, the proximity transponder 112 in the user device 102 may be configured to receive and/or detect the magnetic field when the user device 102 (or the proximity transponder 112) enters within range of the magnetic field. Upon detecting and/or otherwise determining the magnetic field, the proximity transponder 112 may be configured to transmit, to the base station 122 (e.g., the proximity reader 130), identification information associated with the user device 102.

Figure 2:
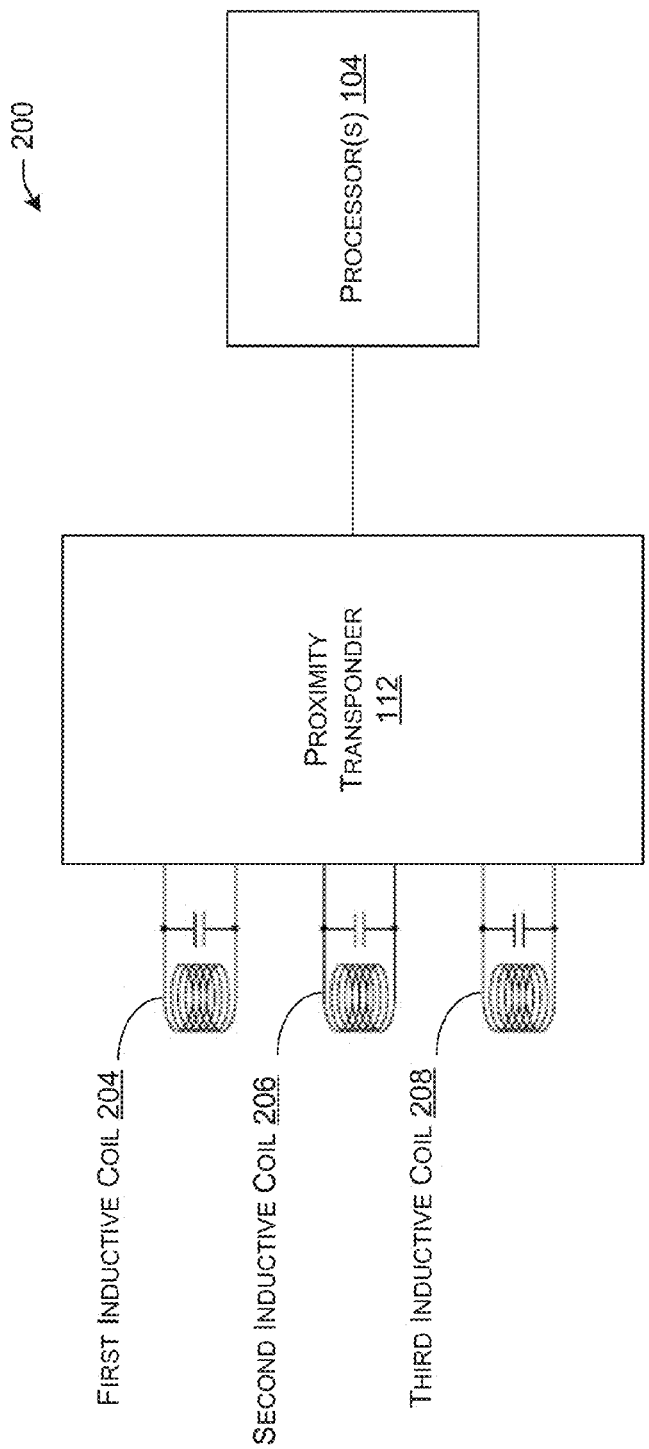
FIG. 2 shows a block diagram of a proximity transponder for establishing wireless communication via proximity detection, according to one or more example embodiments.

For instance, FIG. 2 depicts a block diagram 200 of a proximity transponder 112 coupled to a first inductive coil 204, a second inductive coil 206, and a third inductive coil 208. Upon entering the magnetic field, one or more of the inductive coils may be energized by the magnetic field. To this end, the first inductive coil 204 may be configured to detect and/or otherwise receive the magnetic field along a first coordinate axis. Likewise, the second inductive coil 206 may be configured to receive the magnetic field along a second coordinate axis, and the third inductive coil 208 may be configured to receive the magnetic field along a third coordinate axis. As a result, the proximity transponder 112 may be able to detect and/or receive the magnetic field while being maneuvered in any position and/or orientation in a three-dimensional space. For example, a combination of one or more of the inductive coils may be energized by receiving the magnetic field along one or more of the coordinate axes.

In certain embodiments, as a result of being energized by the magnetic field, one or more of the inductive coils 204/206/208 may provide power to the proximity transponder 112. The proximity may then use the power to transmit identification information associated with the user device 102 to the base station 122. In this manner, identification information may be transmitted to the base station 122 without requiring any power on the part of the user device 102. For instance, the user device 102 may be a mobile phone having a battery (not illustrated), and the base station may be a wireless display device. To this end, the mobile phone may be configured to transmit identification information, via the proximity transponder 112, without draining and/or otherwise using the power from the battery. Instead, the proximity transponder 112 may be energized and/or powered (e.g., via its inductive coils 204/206/208) upon entering the 3D magnetic filed emitted by the proximity reader 130 of the base station 122. It will be appreciated that while FIG. 2 illustrates the proximity transponder 112 as being coupled to three inductive coils 204/206/208, any number of inductive coils may be used and are contemplated within the present disclosure. In addition, it will be appreciated that in certain implementations, the base station may 122 be coupled to a constant power source, although in other implementations, the base station 122 may also be configured to operate using battery power.

Referring back now to FIG. 1, upon entering the magnetic field (e.g., being energized by the magnetic field), the proximity transponder 112 may be configured initiate a "wake-up" sequence for the user device 102. For instance, the proximity transponder 112 may transmit instructions to the user device 102 (e.g., to the communication application 108) that cause the user device 102 to transition from a first power state (e.g., a sleep state) to a second power state (e.g., a full-power state). As another example, the user device 102 may be a mobile device in sleep mode with its display 116 in an OFF state. If the mobile device is placed within range of the magnetic field emitted by the proximity reader 130, the proximity transponder 112 may be configured to initiate a "wake-up" sequence. As a result, the mobile device may transition to a fully powered state, which may also cause its display to be switched to an ON state.

In some implementations, upon receiving the identification information from the user device (e.g., from the proximity transponder 112), the base station 122 may determine whether the identification information is valid. For instance, the base station 122 may determine whether the identification information matches one or more identifiers and/or credential information. Such information may be stored in memory 126, a database (not pictured), and/or any other storage location both local and/or remote to the base station 122. If the base station 122 determines that the identification information is valid, the base station 122 may transmit a verification of the identification information back to the user device 102. On other hand, if the base station 122 determines that the identification information is invalid, then the base station 122 may notify the user device 102 of the invalidity.

According to one or more embodiments, the proximity transponder 112 may be configured to perform additional operations upon detecting and/or receiving the magnetic field from the base station 122 (e.g., emitted by the proximity reader 130). For example, the proximity transponder 112 may transmit radio communication information to the proximity reader 130 of the base station 122. The radio communication information may include any type of data that facilitates the establishment of a radio connection between the user device 102 and the base station 122. For example, the radio communication information may include a network address identifier (e.g., a media access control (MAC) address), a pairing key, and/or the like associated with the radio transceiver 110 of the user device 102. In certain implementations, the radio communication information may be stored on the user device 102, such as in memory 106. Alternatively, the radio communication information may be stored in any storage location, both local and/or remote to the user device 102. Upon receiving the radio communication information from the proximity transponder 112, the proximity reader 130 may provide the radio communication information to the base station radio transceiver 128 of the base station 122.

According to certain embodiments, base station radio transceiver 128 may establish, based at least in part on the received radio communication information, a radio connection with the radio transceiver 110 of the user device 102. For instance, as discussed above, the radio communication information may include a MAC address and/or pairing key associated with the radio transceiver 110. To this end, the base station radio transceiver 128 may pair and/or otherwise connect with the radio transceiver 110 of the user device 102 using the MAC address and/or pairing key. In some implementations, a communication application 108 in the user device 102 may be used to facilitate the establishment of the radio connection with the base station 122 as well as facilitate further communication with the base station 122 once the radio connection has been created.

In certain embodiments, upon establishing a radio connection between the base station radio transceiver 128 and the radio transceiver 110, the base station 122 may instruct the proximity reader 130 to cease emitting the magnetic field. Furthermore, if the base station 122 determines that the radio connection with the user device 122 has been broken, lost, and/or otherwise disconnected, the base station 122 may instruct the proximity reader 130 to begin emitting the magnetic field once again.

It will be appreciated that numerous types of radio connections may be established between the user device 102 and the base station 122. For example, the base station 122 may include and/or may be coupled to a wireless display device, and the radio connection may include a streaming wireless display connection. To this end, the base station radio transceiver 128 may be configured to transmit wireless display connection information to the radio transceiver 110 of the user device 102. The wireless display connection information may include any type data that may facilitate a streaming wireless display connection between the user device 102 and the base station 122. For instance, the wireless display connection information may include a wireless display identifier and/or a personal identification number (PIN) associated with the base station 122. Upon receipt of the wireless display connection by the radio transceiver 110, a streaming wireless display connection may be established between the user device 102 and the base station 122.

As another example, the radio connection may include a wireless gigabit radio connection (e.g., a WiGig connection) for transmitting data between the user device 102 and the base station 122. In yet other implementations, the radio connection may include "check-in" type communication, in which the base station 122 may determine the presence of a particular user upon the user device 102 entering the magnetic field (e.g., boarding an airplane, ticketing for a sports event or other event, etc.). In some implementations, the radio connection may include a media streaming connection between the user device and a vehicle infotainment system. As such, the radio connection may facilitate communicating various types of information such as direction routing information, video data, audio data, and/or the like.

Moreover, it will be appreciated that the proximity transponder 112 and the proximity reader 130 described herein may include radio frequency identification (RFID) technology. For example, the proximity transponder 112 may be an RFID tag (e.g., a passive tag, though active tags are also contemplated), and the proximity reader 130 may be an RFID reader. Additionally, in certain implementations, the proximity transponder 112 and the proximity reader 130 may communicate in a relatively low frequency band, such as an approximate range of 120 KHz to 150 KHz, although other ranges are also possible. In other implementations, the proximity transponder 112 and/or the proximity reader 130 may utilize other wireless communication technology (e.g., Bluetooth, Bluetooth Low-Energy, Wi-Fi, Long Term Evolution, Long Term Evolution-Advanced, and/or the like).

Figure 3:
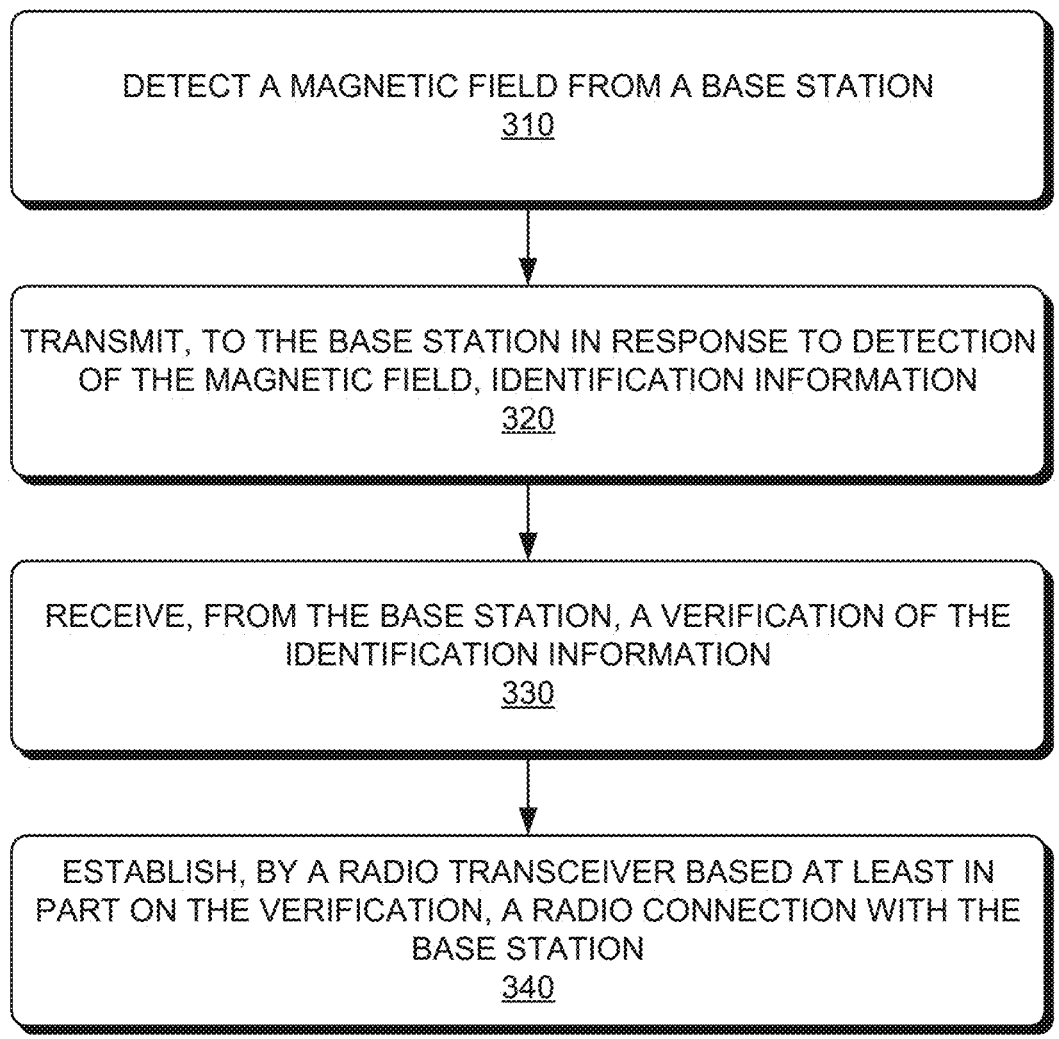
FIG. 3 show a flow diagram for establishing wireless communication via proximity detection, according to one or more example embodiments.

Referring now to FIG. 3, a flow diagram of a method 300 is illustrated for establishing wireless communication via proximity detection in accordance with one or more example embodiments. The method 300 may generally describe operations from the perspective of a user device. As such, the method 300 may begin in block 310, where a user device 102 may be configured to detect a three-dimensional (3D) magnetic field from a base station 122. The user device 102 may include one or more processors 104, a radio transceiver 110, and a proximity transponder 112. In block 320, the user device 102 may transmit, to the base station 122 in response to detection of the magnetic field, identification information associated with the user device 102. In certain implementations, such a request may be transmitted using short-wavelength radio signals, such as Bluetooth signals and/or Bluetooth Low-Energy signals.

In block 330, the user device 102 may be receive, from the base station 122, a verification of the identification information. The verification may indicate that the base station 122 determined the identification information to be valid. In block 340, the user device 102 may establish, by the radio transceiver 110 based at least in part on the verification, a radio connection with the base station 122.

Figure 4:
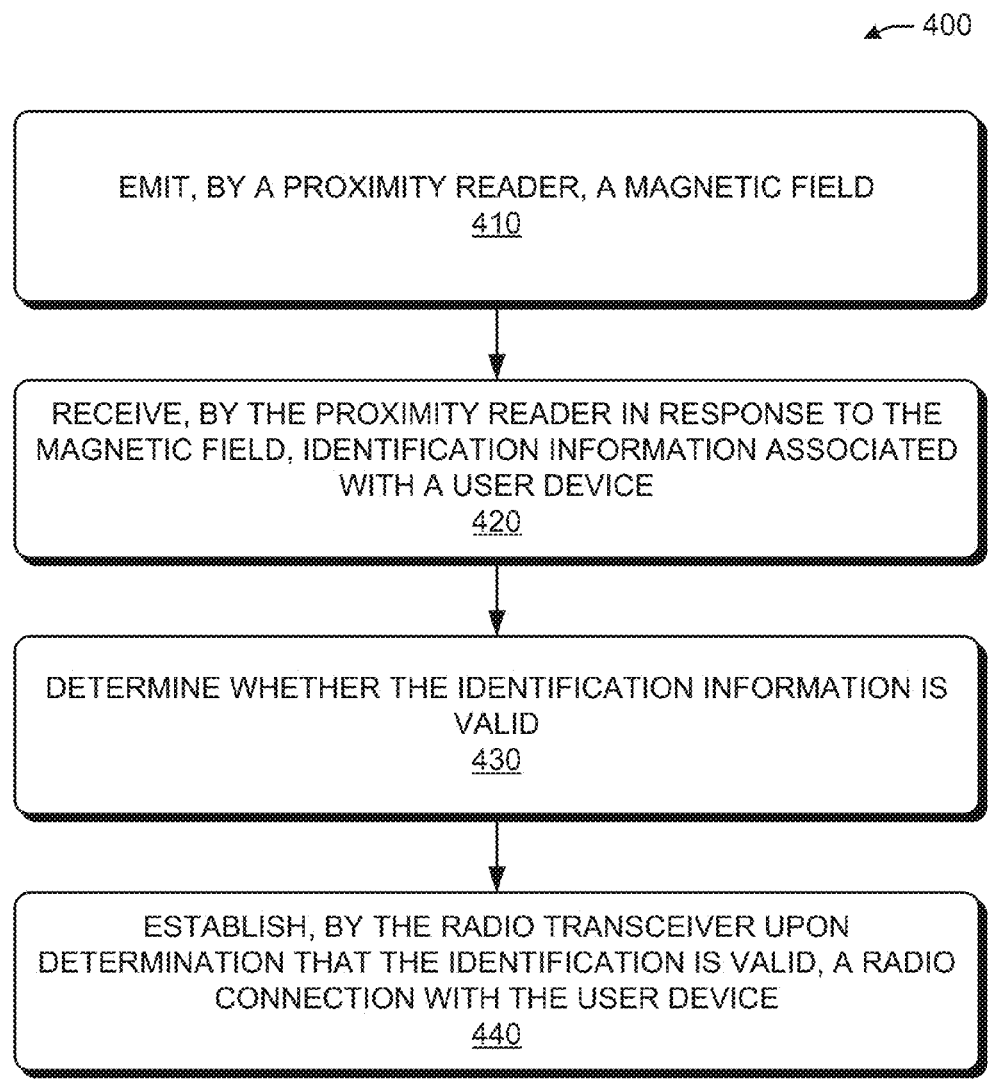
FIG. 4 shows a flow diagram for establishing wireless communication via proximity detection, according to one or more example embodiments.

Referring now to FIG. 4, a flow diagram of a method 400 is provided that depicts establishing wireless communication via proximity detection in accordance with one or more example embodiments. The method 400 may generally describe operations from the perspective a base station (e.g., base station 122). As such, the method 400 may begin in block 410, where a base station 122 may emit, by a proximity reader 130, a three-dimensional magnetic field. Additionally, the base station 122 may include a radio transceiver 128, a proximity reader 130, and one or more processors 124. In block 420, the base station 122 may be configured to receive, by the proximity reader 130 in response to the magnetic field, identification information associated with a user device (e.g., user device 102).

In block 430, the base station 122 may be configured to determine whether the identification information is valid (e.g., in order to verify whether a radio connection may be established). To this end, in block 440, the base station 122 may be configured to establish, by the radio transceiver 128 upon determination that the identification information is valid, a radio connection with the user device 102.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a user device, comprising: a radio transceiver; a proximity transponder having a plurality of inductive coils; at least one processor; and at least one memory storing instructions, that when executed by the at least one processor, causes that at least one processor to: detect, by the proximity transponder via the plurality of inductive coils, a magnetic field emitted from a base station; transmit, by the proximity transponder to the base station in response to the magnetic field, identification information; receive, from the base station, a verification of the identification information; and establish, by the radio transceiver based at least in part on the verification, a radio connection with the base station.

In Example 2, the subject matter of Example 1 can optionally include instructions that cause the at least one processor to: initiate, in response to the signal, a transition of the user device from a first power state to a second power state.

In Example 3, the subject matter of Example 1 can optionally include that the plurality of inductive coils comprise: a first inductive coil to receive the magnetic field along a first coordinate axis; a second inductive coil to receive the magnetic field along a second coordinate axis; and a third inductive coil to receive the magnetic field along a third coordinate axis.

In Example 4, the subject matter of Example 1 can optionally include that the instructions to establish the radio connection with the base station further comprise instructions to: transmit, by the proximity transponder, radio communication information associated with the radio transceiver to the base station; and receive, by the radio transceiver, a request from the base station to establish the radio connection.

In Example 5, the subject matter of Example 1 can optionally include that the radio connection comprises a streaming wireless display connection.

In Example 6, the subject matter of Example 1 can optionally include that the radio connection comprises a wireless gigabit connection In Example 7, the subject matter of Example 1 can optionally include that the radio transceiver comprises a radio frequency identification tag.

Example 8 is a method, comprising: determining, by a computer via a plurality of induction coils in a proximity transponder, a magnetic field emitted from a base station, the computer comprising one or more processors, a radio transceiver, and the proximity transponder; transmitting, by the proximity transponder to the base station in response to the magnetic field, identification information; receiving, from the base station, a verification of the identification information; and establishing, by the radio transceiver based at least in part on the verification, a radio connection with the base station.

In Example 9, the subject matter of Example 8 can optionally include initiating, in response to the signal, a transition of the user device from a first power state to a second power state.

In Example 10, the subject matter of Example 8 can optionally include that the plurality of inductive coils comprise: a first inductive coil to receive the magnetic field along a first coordinate axis; a second inductive coil to receive the magnetic field along a second coordinate axis; and a third inductive coil to receive the magnetic field along a third coordinate axis.

In Example 11, the subject matter of Example 8 can optionally include that establishing the radio connection with the base station further comprises: transmitting, by the proximity transponder, radio communication information associated with the radio transceiver to the base station; and receiving, by the radio transceiver, a request from the base station to establish the radio connection.

In Example 12, the subject matter of Example 8 can optionally include that the radio connection comprises a streaming wireless display connection.

In Example 13, the subject matter of Example 8 can optionally include that the radio connection comprises a wireless gigabit connection.

In Example 14, the subject matter of Example 8 can optionally include that the radio transceiver comprises a radio frequency identification tag.

Example 15 is a non-transitory computer-readable medium comprising instructions, that when executed by at least one processor, cause the at least one processor to: determine, by a proximity transponder having a plurality of inductive coils, a magnetic field emitted from a base station; transmit, via the proximity transponder, to the base station in response to the magnetic field, identification information; receive, from the base station, a verification of the identification information; and establish, by a radio transceiver based at least in part on the verification, a radio connection with the base station.

In Example 16, the subject matter of Example 15 can optionally include instructions that cause the at least one processor to: initiate, in response to the signal, a transition of the user device from a first power state to a second power state.

In Example 17, the subject matter of Example 15 can optionally include that the plurality of inductive coils comprise: a first inductive coil to receive the magnetic field along a first coordinate axis; a second inductive coil to receive the magnetic field along a second coordinate axis; and a third inductive coil to receive the magnetic field along a third coordinate axis.

In Example 18, the subject matter of Example 15 can optionally include that the instructions to establish the radio connection with the base station further comprise instructions to: transmit, by the proximity transponder, radio communication information associated with the radio transceiver to the base station; and receive, by the radio transceiver, a request from the base station to establish the radio connection.

In Example 19, the subject matter of Example 15 can optionally include that the radio connection comprises a streaming wireless display connection.

In Example 20, the subject matter of Example 15 can optionally include that the radio connection comprises a wireless gigabit connection.

In Example 21, the subject matter of Example 15 can optionally include that the radio transceiver comprises a radio frequency identification tag.

Example 22 is a system, comprising: a radio transceiver; a proximity reader; at least one processor; and at least one memory storing computer-executable instructions, that when executed by the at least one processor, causes the at least one processor to: emit, by the proximity reader, a magnetic field; receive, by the proximity reader in response to the magnetic field, identification information associated with a user device; determine whether the identification information is valid; establish, by the radio transceiver upon determination that the identification is valid, a radio connection with the user device.

In Example 23, the subject matter of Example 22 can optionally include that the at least one memory further comprises computer-executable instructions that cause the at least one processor to: cease emission of the magnetic field upon establishment of the radio connection with the user device.

In Example 24, the subject matter of Example 23 can optionally include that the at least one memory further comprises computer-executable instructions that cause the at least one processor to: determine that the radio connection with the user device has been lost; and emit the magnetic field upon determination of the loss of the radio connection.

In Example 25, the subject matter of Example 22 can optionally include that the proximity reader comprises a radio frequency identification reader.

In Example 26, the subject matter of Example 22 can optionally include that the radio connection comprises a streaming wireless display connection.

In Example 27, the subject matter of Example 22 can optionally include that the radio connection comprises a wireless gigabit connection.

Example 28 is an apparatus for establishing wireless communication, comprising: means for determining, a magnetic field emitted from a base station; means for transmitting, to the base station in response to the magnetic field, identification information; means for receiving, from the base station, a verification of the identification information; and means for establishing, based at least in part on the verification, a radio connection with the base station.

In Example 29, the subject matter of Example 28 can optionally include means for initiating, in response to the signal, a transition of the user device from a first power state to a second power state.

In Example 30, the subject matter of Example 28 can optionally include means for receiving the magnetic field along a first coordinate axis; means for receiving the magnetic field along a second coordinate axis; and means for receiving the magnetic field along a third coordinate axis.

In Example 31, the subject matter of Example 28 can optionally include that establishing the radio connection with the base station further comprises: means for transmitting radio communication information associated with the radio transceiver to the base station; and means for receiving a request from the base station to establish the radio connection.

In Example 32, the subject matter of Example 28 can optionally include that the radio connection comprises a streaming wireless display connection.

In Example 33, the subject matter of Example 28 can optionally include that the radio connection comprises a wireless gigabit connection.

In Example 34, the subject matter of Example 28 can optionally include that the radio transceiver comprises a radio frequency identification tag.

Example 35 is a method for establishing wireless communication, comprising: emit, by a computer comprising one or more processors, a radio transceiver, and a proximity reader, a magnetic field; receiving, by the proximity reader in response to the magnetic field, identification information associated with a user device; determining whether the identification information is valid; and establishing, by the radio transceiver upon determination that the identification is valid, a radio connection with the user device.

In Example 36, the subject matter of Example 35 can optionally include ceasing emission of the magnetic field upon establishment of the radio connection with the user device.

In Example 37, the subject matter of Example 36 can optionally include determining that the radio connection with the user device has been lost; and emitting the magnetic field upon determination of the loss of the radio connection.

In Example 38, the subject matter of Example 35 can optionally include that the proximity reader comprises a radio frequency identification reader.

In Example 39, the subject matter of Example 35 can optionally include that the radio connection comprises a streaming wireless display connection.

In Example 40, the subject matter of Example 35 can optionally include that the radio connection comprises a wireless gigabit connection.

What is claimed is:

1. A user device, comprising:
   a radio transceiver;
   a proximity transponder having a plurality of inductive coils;
   at least one processor; and
   at least one memory storing instructions, that when executed by the at least one processor, causes that at least one processor to:
   detect, by the proximity transponder via the plurality of inductive coils, a magnetic field emitted from a base station;
   transmit, by the proximity transponder to the base station in response to the magnetic field, identification information, wherein the identification information identifies radio communication information associated with the radio transceiver;
   receive, from the base station, a verification of the identification information, wherein the verification of the identification information comprises a request from the base station to establish a radio connection with the base station using the radio communication information; and establish, by the radio transceiver based at least in part on the verification, the radio connection with the base station.

2. The user device of claim 1, further comprising instructions that cause the at least one processor to:
initiate, in response to the signal, a transition of the user device from a first power state to a second power state.

3. The user device of claim 1, wherein the plurality of inductive coils comprise:
a first inductive coil to receive the magnetic field along a first coordinate axis;
a second inductive coil to receive the magnetic field along a second coordinate axis; and
a third inductive coil to receive the magnetic field along a third coordinate axis.

4. The user device of claim 1, wherein the radio connection comprises a streaming wireless display connection.

5. The user device of claim 1, wherein the radio connection comprises a wireless gigabit connection.

6. The user device of claim 1, wherein the radio transceiver comprises a radio frequency identification tag.

7. A method for establishing wireless communication, comprising:
determining, by a computer via a plurality of induction coils in a proximity transponder, a magnetic field emitted from a base station, the computer comprising one or more processors, a radio transceiver, and the proximity transponder;
transmitting, by the proximity transponder to the base station in response to the magnetic field, identification information, wherein the identification information identifies radio communication information associated with the radio transceiver;
receiving, from the base station, a verification of the identification information, wherein the verification of the identification information comprises a request from the base station to establish the radio connection using the radio communication information; and
establishing, by the radio transceiver based at least in part on the verification, the radio connection with the base station.

8. The method of claim 7, further comprising:
initiating, in response to the signal, a transition of the user device from a first power state to a second power state.

9. The method of claim 7, wherein the plurality of inductive coils comprise:
a first inductive coil to receive the magnetic field along a first coordinate axis;
a second inductive coil to receive the magnetic field along a second coordinate axis; and
a third inductive coil to receive the magnetic field along a third coordinate axis.

10. The method of claim 7, wherein the radio connection comprises a streaming wireless display connection.

11. The method of claim 7, wherein the radio connection comprises a wireless gigabit connection.

12. The method of claim 7, wherein the radio transceiver comprises a radio frequency identification tag.

13. A non-transitory computer-readable medium comprising instructions, that when executed by at least one processor, cause the at least one processor to:
determine, by a proximity transponder having a plurality of inductive coils, a magnetic field emitted from a base station;
transmit, via the proximity transponder, to the base station in response to the magnetic field, identification information, wherein the identification information identifies radio communication information associated with the radio transceiver;
receive, from the base station, a verification of the identification information, wherein the verification of the identification information comprises a request from the base station to establish a radio connection with the base station using the radio communication information; and
establish, by a radio transceiver based at least in part on the verification, the radio connection with the base station.

14. The computer-readable medium of claim 13, further comprising instructions that cause the at least one processor to:
initiate, in response to the signal, a transition of the user device from a first power state to a second power state.

15. The computer-readable medium of claim 13, wherein the plurality of inductive coils comprise:
a first inductive coil to receive the magnetic field along a first coordinate axis;
a second inductive coil to receive the magnetic field along a second coordinate axis; and
a third inductive coil to receive the magnetic field along a third coordinate axis.

16. The computer-readable medium of claim 13, wherein the radio connection comprises a streaming wireless display connection.

17. The computer-readable medium of claim 13, wherein the radio connection comprises a wireless gigabit connection.

18. The computer-readable medium of claim 13, wherein the radio transceiver comprises a radio frequency identification tag.

19. A system for establishing wireless communication, comprising:
a radio transceiver;
a proximity reader;
at least one processor; and
at least one memory storing computer-executable instructions, that when executed by the at least one processor, causes the at least one processor to:
emit, by the proximity reader, a magnetic field;
receive, by the proximity reader in response to the magnetic field, identification information associated with a user device, wherein the identification information identifies radio communication information associated with a radio transceiver in the user device;
determine whether the identification information is valid; and
establish, by the radio transceiver upon determination that the identification is valid, a radio connection with the user device.

20. The system of claim 19, wherein the at least one memory further comprises computer-executable instructions that cause the at least one processor to:
cease emission of the magnetic field upon establishment of the radio connection with the user device.

21. The system of claim 20, wherein the at least one memory further comprises computer-executable instructions that cause the at least one processor to:
determine that the radio connection with the user device has been lost; and
emit the magnetic field upon determination of the loss of the radio connection.

22. The system of claim 19, wherein the proximity reader comprises a radio frequency identification reader.

23. The system of claim 19, wherein the radio connection comprises a streaming wireless display connection.

24. The system of claim 19, wherein the radio connection comprises a wireless gigabit connection.

\* \* \* \* \*